INVENTOR:
Alfred VOGEL by  Karl F. Ross

AGENT

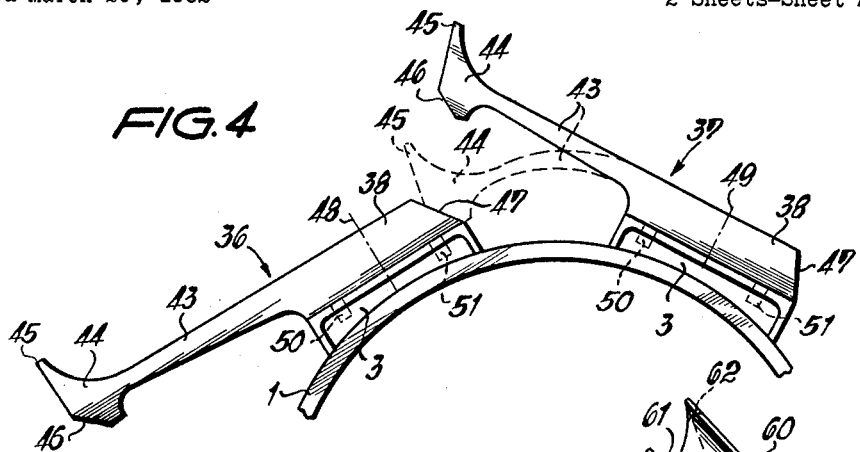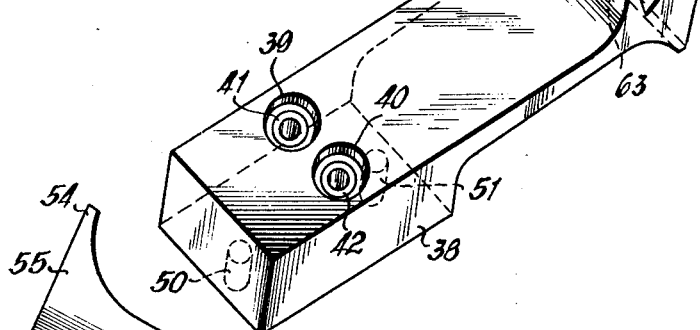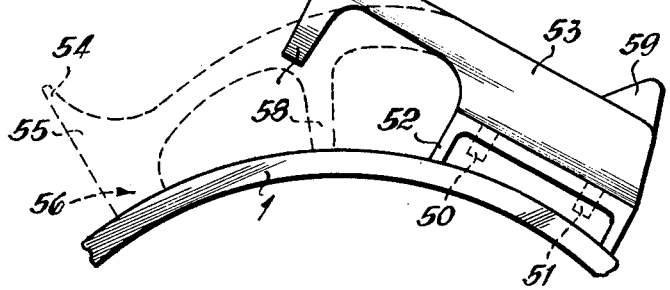

United States Patent Office 3,140,596
Patented July 14, 1964

3,140,596
APPARATUS FOR THE DEPILATION OF
ANIMAL SKINS
Alfred Vogel, Jenerseitedeich 60,
Hamburg-Kirchdorf, Germany
Filed Mar. 20, 1962, Ser. No. 181,028
Claims priority, application Germany Mar. 22, 1961
21 Claims. (Cl. 69—37)

This invention relates to apparatus for the depilation of animal skins, especially of pig skins, and relates particularly to improved beaters for use in rotary depilating machines.

In known machines for the depilation of pig skins, the skins are placed on wheels, rollers or the like, which are rotatably arranged side by side. The skins are of considerable weight, so that the beating elements which are drawn along under the skins are subjected to very high stresses. In order to obtain good depilation, the beaters must therefore have a certain elasticity, so that the shape of the beaters may conform to a large extent to the shape of the skins.

Known beaters comprise a hard rubber web, to which one or more metal scrapers are attached, for instance in pairs, by means of rivets or bolts. These scrapers are in turn fixed to one another with rivets and this results in projecting corners on the edges of the scrapers and also on the rivet or bolt heads. Bristles collect on these projections and cause soiling; cleaning is comparatively difficult, and gaps or fissures also arise between the individual components. It is to be noted that attachment surfaces are used to attach the scrapers by their undersides to the rubber web.

Because of the relatively large stresses, a certain bearing surface is necessary between the scrapers and the web, in the longitudinal direction of the beaters; since the scrapers of known beaters are constructed of metal, the length of bearing surface is not elastically deformable. The deformability of known beaters is therefore small and is also concentrated in a short and very highly stressed web portion. This stressing causes known beaters to be readily broken, whereupon they must be replaced. The tendency to break is increased because a considerable reduction in the cross-section of the end of the very highly stressed portion is always necessitated by virtue of the holes needed for the securing of the scraper and the beater itself.

A beater has also been proposed in which the web is of plastic material, and the scraper is fixed thereto in the manner described. This embodiment is also subject to the disadvantages described above and has therefore not gained acceptance.

It is therefore an object of the present invention to provide a beater, for use in a depilating machine, which is not subject to the above-described disadvantages.

A depilating beater according to the invention is constructed in one piece from synthetic resin material, and comprises an attachment portion for fixing the beater to a wheel, and an elastically deflectable limb carrying at least one upwardly directed scraper which is substantially perpendicular to the long axis of the scraper.

According to a preferred embodiment, the free end of the beater is enlarged or reinforced by an accumulation of material to form a head, the lower surface of which may advantageously form a hammer-like contact surface which limits the extent of the elastic deflection of the limb of the web; the reinforcement may be located under at least one scraper-like projection.

It is further preferred that each beater is fixed on to the rotatable wheel or roller of the depilating machine in such a position that at the end of its greatest deflection its contact surface strikes an abutment surface on the fixed end of the neighbouring beater.

It is also advantageous to provide a support in the middle region of the beater, in the form of a projection from the flexible limb. In one embodiment, the beaters are arranged in an overlapping manner, so that the free end of each limb is supported upon its deflection by the intermediate region of the successively adjacent beater. Thus an enlarged head of one beater can be supported on the upper surface of the attachment portion of another beater, and on the end of the attachment portion distal from the flexible limb there is an upwardly directed abutment surface, upon which the middle of the flexible limb of the beater situated next upon the wheel can rest. This abutment surface is advantageously of convex shape, and the curve of the flexible limb of an adjacent beater is shaped complementarily thereto.

A particular feature of the invention is an elastic construction of the abutment surfaces of the beater. Such elasticity is brought about in one embodiment by using a compressible material, which is arranged on the abutment surfaces either as a projection of the wheel or of the end of the fixing portion of the beater. Advantageously the invention provides beaters on the mounting surfaces of the wheel having extensions of the attachment portions behind and over the mounting surfaces and support surfaces on the elastically deflectable ends which overhang the mounting surfaces.

A further advantageous feature relates to the means for attaching the beaters to the wheel. For this purpose there may be used adjacent mounting bolts which are perpendicular to the longitudinal axis of a beater, and which pass through holes pierced through the beaters; these holes are lined with resilient sleeves. The mounting or supporting portion of the beater may also be provided with two peg-like projections, which are slidingly fitted into two corresponding recesses in the contiguous fixing surfaces of the wheel. Two or more scrapers can be arranged on the free end of the beater. These scrapers can for example be formed as a corrugation with projections of a triangular cross-section, extending along about half the length of the deflectable limb.

The invention is described below in connection with certain preferred embodiments thereof, as shown in the accompanying drawing, in which:

FIGURE 4 is also similar to FIGURE 2, and shows yet another embodiment of beater;

FIGURE 5 shows yet a further embodiment of beater; and

FIGURE 6 is a perspective view of another embodiment.

Figure 1:
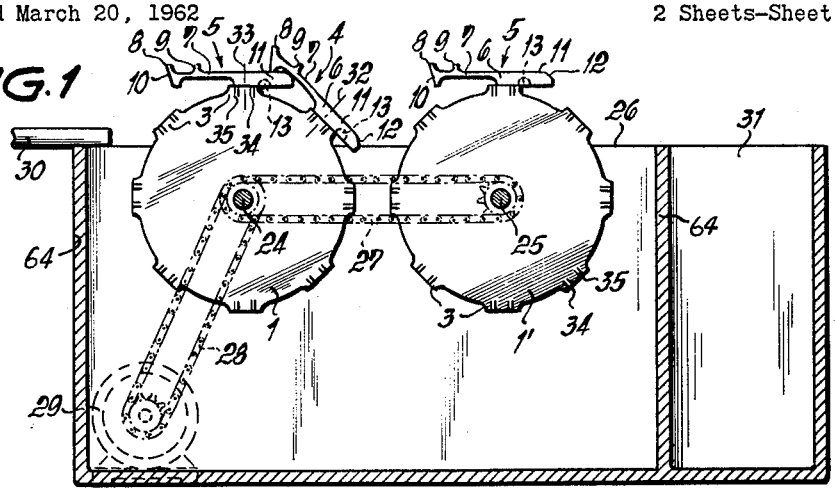
FIGURE 1 is a schematic side view, partly in section, of a depilating machine showing an arrangement of beaters according to one embodiment of the invention.

As shown in FIG. 1, two rollers 1, 1' are mounted on spindles 24, 25, which are rotatably supported on the side walls 26 of a trough whose sectioned end walls are designated 64. The ends of the spindles project through the side walls of the trough and are connected by a transmission, such as chain drive, shown schematically at 27, 28 to a driving motor, indicated at 29, by which the rollers can be rotated. On the left-hand side of the trough is shown a work table 30, and on the right-hand side a scalding tank 31, which are not to be considered as forming part of the invention.

Figure 2:
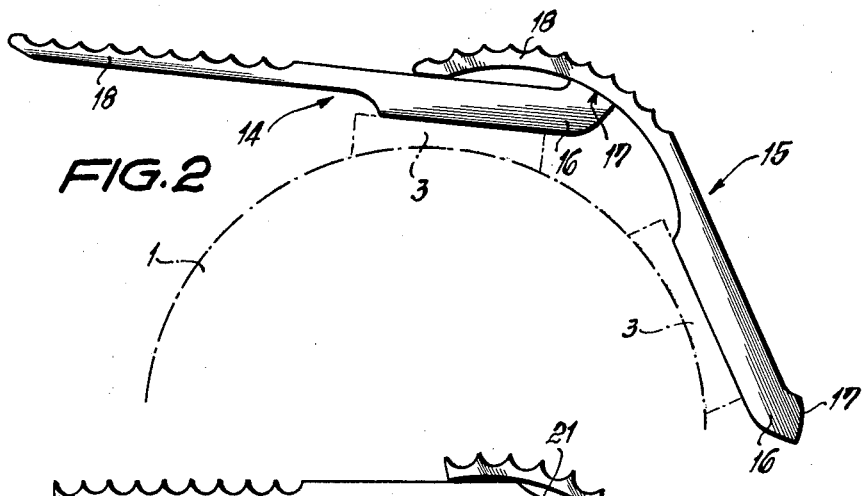
FIGURE 2 is a side view on a larger scale, showing another embodiment of the beaters, a roller being schematically indicated and one beater being shown in its deflected position.
Figure 3:
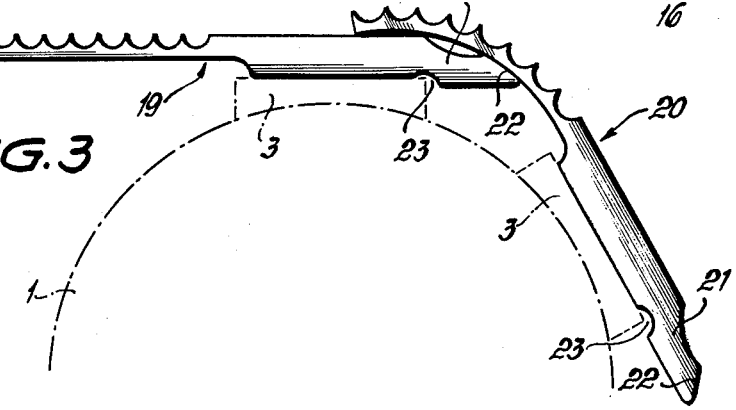
FIGURE 3 is similar to FIGURE 2 and shows a modified form of beater.

In each of FIGS. 1 to 3 two beaters are shown, of which one is in the unstressed position and one is shown deflected. In FIG. 4 the deflected position of one beater is shown in dotted line, as also in FIG. 5, where only one beater is shown.

The beaters are all composed of synthetic resin plastic material, and most preferably of a polyamide-based material.

The circumference of the rollers 1, 1' or of the rims of these rollers are divided into platform-like supporting surfaces on each of which a beater is fixed. In FIG. 1, two adjacent beaters of a roller are indicated generally at 4 and 5, and each comprises a generally central attachment portion 6, which is fixed to the respective support surface 3 of the roller 1 or 1', and a flexible limb portion 7 which is advantageously of smaller cross-section than the attachment portion 6. This limb portion 7 bears on its upper surface two scrapers 8, 9; below the scraper 8 at the end of the limb there is provided a reinforcing projection 10. The attachment portion 6 is also extended in the opposite direction from the limb to form a projection 11 which carries an abutment surface 12 for engagement with the deflected end of the limb 7 of the adjacent beater. This surface 12 is, advantageously, cylindrically curved in conformity with the curvature of the deflected limb 7. The attachment surfaces 3 and hence the beaters 4, 5 are so arranged that the enlarged head 8 is supported, upon deflection of the limb 7, by the upper surface of the attachment portion 6 substantially in the region of the mounting surface 3, so that the middle portion of the limb rests firmly upon the abutment surface 12. Deflection of the limb 7 as a result of the external forces acting upon it pushes the supporting portion with its middle region on the supporting surface, so that too great a curvature under load is avoided.

The projection 11 can, because it overhangs the mounting surface 3, be elastically deflected in the direction of the surface of the roller by the forces acting on the abutment 12. This elasticity can be increased by forming a groove 13 (shown in broken lines), in the underside of the projection 11, next to the edge of the mounting surface 3.

The positions of the securing bolts for the illustrated pair of beaters 4, 5 on roller 1 are indicated by broken lines at 32, 33; they are screwed into threaded holes in the mounting surface 3.

A further advantageous feature is also shown for the beaters of FIG. 1; two projections 34, 35 are formed integrally with the plastic beater on the underside of the attachment portion 6 and in the longitudinal median plane of the beater; the projections engage with a sliding fit in corresponding recesses in the surface 3 and prevent twisting of the beater if the bolts are knocked out from the openings arranged in the attachment portion 6.

The embodiments of FIGS. 2 and 3 differ notably in the arrangement of their abutment surfaces, the absence of reinforced heads, and the development of the scrapers as a corrugated surface.

In FIG. 2, the beaters indicated generally at 14 and 15 each have a rearward extension 16, which is turned upwardly at its end so as to form an abutment surface 17. The deflected limb 18 is supported at its tip by the upper surface of the attachment portion of the beater 14 and at its middle portion by the abutment surface 17. This arrangement has the advantage of ensuring that in operation the corrugated surface 18 is always convex.

According to FIG. 3, the beaters 19, 20 each have a rearward extension 21, which also extends downwardly, the upper surface of which bears an obliquely directed and convexly shaped abutment surface 22. The action of this abutment surface is similar to that of the surface 17 in FIG. 2, and it may be mentioned that, in the case of the curvature shown, there can be arranged, between the upper side of the attachment portion of the beaters and the surface 22, a convexly curved connection piece in conformity with the underside of a curved limb of the beater 20. The elasticity of the abutment surface 22 can be increased by cutting a groove as shown at 23, thus forming a reduced neck which connects the extension 21 with the body of the beater.

In FIG. 4 only the rim of the roller 1 is shown. On the circumference of this rim, angularly spaced mounting surfaces 3 are radially arranged. In FIG. 4 the beaters, indicated generally at 36 and 37, are each fixed to a mounting surface 3. The attachment portion of body 38 of each beater above the mounting surface is thick, and may be pierced with two holes through which mounting means such as rivets or bolts may be passed, as is shown at 39, 40 in FIG. 6. These holes are formed so that the head of the mounting means is sunk below the surface of the body 38. The holes shown in FIG. 6 are lined with rubber sleeves 41, 42, so that the mounting means are elastically supported; further flexibility is thus obtained.

With further reference to FIG. 4, the free end of the limb 43 forms a head 44 whose upper part is elongated into a scraper 45, whilst the lower surface forms a support for engagement during elongation with an oblique abutment surface 47 on the body 38 of the adjacent beater. The beaters 37, 38 are arranged on the circumference of the wheel 1 an appropriate distance apart for the surface 46 to strike the surface 47 on elastic deflection of the limb 43. In this way the greatest possible deflection of the limb 43 is obtainable in a stable manner.

The location of the mounting means is shown in FIG. 4 by the dot-dash lines 48, 49. Peg-like projections 50, 51 are shown by broken lines; these projections fit into corresponding recesses in the support surfaces 3, so as to prevent any sideways twisting of the beaters.

In FIG. 5, a portion of a wheel 1 is again represented; upon this wheel there are arranged mounting surfaces 52 and beaters 53 which are spaced apart from each other around the circumference of the wheel, at a distance such that the flexible end of one beater does not come into any contact with the next beater. At its free end the beater 53 carries a hammer-like head 55 which terminates above in a scraper 54 and below in a contact surface 57; the weight of the head 55 is so great at its maximum deflection that it contacts the surface of the wheel 1 in the position 56 shown by the broken lines. The surface 57 is arranged to be substantially parallel to the surface of the wheel 1 in position 56. This large head 55, which is constructed in one piece with the beater, also considerably strengthens the scraper portion of the beater.

The beater 53 shown in FIG. 5 may also have attached to the underside of the central region of its flexible limb a peg-like projection 58 extending obliquely to the longitudinal axis of the beater, this projection resting directly on the surface of the wheel 1 in the fullest deflection and thus preventing too strong a stressing of the flexible limb.

The beater shown in FIG. 5 may also advantageously have on its upper surface a rounded projection 59 which serves to turn over the skins lying thereon.

In FIG. 6, the single beater, shown in perspective, has two scrapers 60, 61 arranged one behind each other on the upper surface of the flexible limb. The corners of these scrapers can—as shown dotted at 62, 63—be rounded so as to avoid damage to the skins.

It is essential that in all cases the beater is constructed from a single piece of plastic material and not from several pieces as has been the practice hitherto.

What is claimed is:
1. An animal-skin-depilating machine, comprising at least one rotatably arranged wheel, and a plurality of elongated skin beaters which are spaced detachably around the circumference of the wheel, each beater being integrally constructed from synthetic-resin material, each of said beaters comprising an attachment portion for fixing the beater to the wheel, and an elastically deflectable limb integral with said portion, the upper surface of each beater being formed with at least one scraper member substantially transverse to the longitudinal axis of the beater, the deflectable limb of each beater being provided with a contact surface for supporting the limb in a position of maximum deflection.

2. A machine according to claim 1, wherein the free end of each beater is enlarged to form a head having an upper and a lower surface, at least one scraper projection being formed on said upper surface, said contact surface being part of said lower surface.

3. A machine according to claim 2 wherein the angular spacing between adjacent beaters on the wheel is such that, in the position of maximum deflection of each beater, its contact surface strikes an abutment surface formed on a fixed portion of an immediately adjacent beater.

4. A machine according to claim 1, wherein the deflectable limb of each beater overlaps an immediately adjacent beater to such an extent that the free end of said limb is supportable at an intermediate region of said adjacent beater in the position of maximum deflection of said limb.

5. A machine according to claim 4, wherein each beater has an upwardly directed abutment surface formed on an extension of its attachment portion at an extremity thereof remote from its deflectable limb, said abutment surface supporting an intermediate portion of the deflectable limb of an adjacent beater in the latter's position of maximum deflection.

6. A machine according to claim 5, wherein said abutment surface is convexly curved outwardly and the curvature of the deflectable limb of the adjacent beater substantially conforms to the curvature of said abutment surface in said position of maximum deflection.

7. A machine according to claim 5, wherein said extension is resilient.

8. A machine according to claim 7, wherein said extension is connected with said mounting portion by a reduced neck.

9. A machine according to claim 7 wherein said wheel is provided with raised mounting surfaces upon each of which a beater is attached by means of its respective attachment portion, said extension overhanging the corresponding mounting portion in a direction opposite the respective limb.

10. A machine according to claim 9, in which each beater is provided with two adjacent openings extending transversely to the longitudinal axis of the beater through its attachment portion, said openings being traversed by respective mounting bolts in threaded engagement with the corresponding mounting portion of said wheel, each opening being lined with a rubber sleeve through which the bolts are inserted, the attachment portion of each beater being provided with two peg-like projections, and the corresponding mounting portion of the wheel being provided with two corresponding recesses into which the projections pass with a sliding fit.

11. An elongated skin beater, for use in an animal-skin-depilating machine, said beater being integrally formed from synthetic-resin material and having a mobile front end with a formation on its upper surface which is substantially transverse to the longitudinal axis of the beater so as to form at least one scraper member on said mobile end, and an enlargement formed under the scraper for providing a contact surface to limit the maximum deflection of said mobile front end, said beater further having a mounting portion attachable to a wheel and a fixed rear end beyond said mounting portion formed with an upwardly directed abutment surface.

12. A beater according to claim 11, wherein two scraper members are formed on the deflectable end of the beater.

13. A beater according to claim 11, wherein said formation constitutes corrugations consisting of projections substantially triangular in longitudinal section, the corrugations extending over about half the length of the deflectable limb.

14. A beater according to claim 11, wherein the upwardly directed abutment surface is elastic and upwardly convex.

15. A beater according to claim 11, wherein the abutment surface rises above the upper surface of said mounting portion.

16. A beater according to claim 11, wherein the abutment surface is disposed below the upper surface of said mounting portion.

17. A beater according to claim 11, wherein the abutment surface is formed on a projection rising obliquely from the upper surface of said mounting portion.

18. A beater according to claim 11, wherein said mounting portion projects rearwardly to form an elastically deflectable extension provided with the abutment surface.

19. A beater according to claim 18, wherein at least one groove is provided at said deflectable extension for increasing its elasticity.

20. A beater according to claim 11, wherein a downwardly directed extension is provided at the central region of said mobile end and formed integrally therewith to support said mobile end in a position of maximum deflection.

21. A beater according to claim 11, wherein a small downwardly directed peg-like projection is disposed on the underside of said mounting portion.

No references cited.